United States Patent

Vankooten

[11] Patent Number: 6,068,434
[45] Date of Patent: May 30, 2000

[54] POSITIVE LOCKING MULTIPLE BALE TRANSPORTING DEVICE

[76] Inventor: Clifford L. Vankooten, R.R. 2, Box 18, Phillipsburg, Kans. 67661

[21] Appl. No.: 08/985,531

[22] Filed: Dec. 5, 1997

Related U.S. Application Data

[60] Provisional application No. 60/033,228, Dec. 5, 1996.

[51] Int. Cl.[7] ........................................ B60P 1/24
[52] U.S. Cl. ............................ 414/24.5; 298/18
[58] Field of Search ................... 414/24.5, 470, 414/111; 298/18, 8 R, 19 R; 410/80, 81

[56] References Cited

U.S. PATENT DOCUMENTS

| | | | |
|---|---|---|---|
| 2,728,602 | 12/1955 | Casey et al. ............................ | 298/18 |
| 4,092,050 | 5/1978 | Sobeck ................................... | 414/24.5 |
| 4,242,031 | 12/1980 | McMullen ............................... | 298/18 |
| 4,500,242 | 2/1985 | Beikman ................................. | 298/18 |
| 4,508,359 | 4/1985 | Campbell et al. ...................... | 414/24.5 |
| 4,580,843 | 4/1986 | Lund . | |
| 5,018,924 | 5/1991 | Palmer ................................... | 414/245 |
| 5,076,752 | 12/1991 | Rader ..................................... | 298/18 |
| 5,180,271 | 1/1993 | Farden . | |
| 5,277,537 | 1/1994 | Druse, Sr. ............................... | 298/18 |
| 5,340,259 | 8/1994 | Flaskey .................................. | 414/24.5 |
| 5,575,599 | 11/1996 | Conlee et al. .......................... | 410/69 |

FOREIGN PATENT DOCUMENTS

M22922II 12/1956 Germany ................................. 298/18

*Primary Examiner*—Douglas Hess
*Attorney, Agent, or Firm*—Shook, Hardy & Bacon LLP

[57] ABSTRACT

A bale rack is provided which has a base and first and second spaced bale cradles supported on the base for pivotal movement about longitudinally extending parallel axes. Each bale cradle includes at least one depending lock catch which presents an engagement surface extending in a direction transverse to the axes. The bale rack also includes a locking assembly for locking the bale cradles against pivotal movement. The locking assembly includes an elongated shaft extending in a direction parallel to the axes and a plurality of locking pins which are secured to the shaft and which extend in a direction parallel to the axes. The locking assembly further includes a linear actuator for translating the shaft axially to move the locking pins between a locked and an unlocked position.

16 Claims, 3 Drawing Sheets

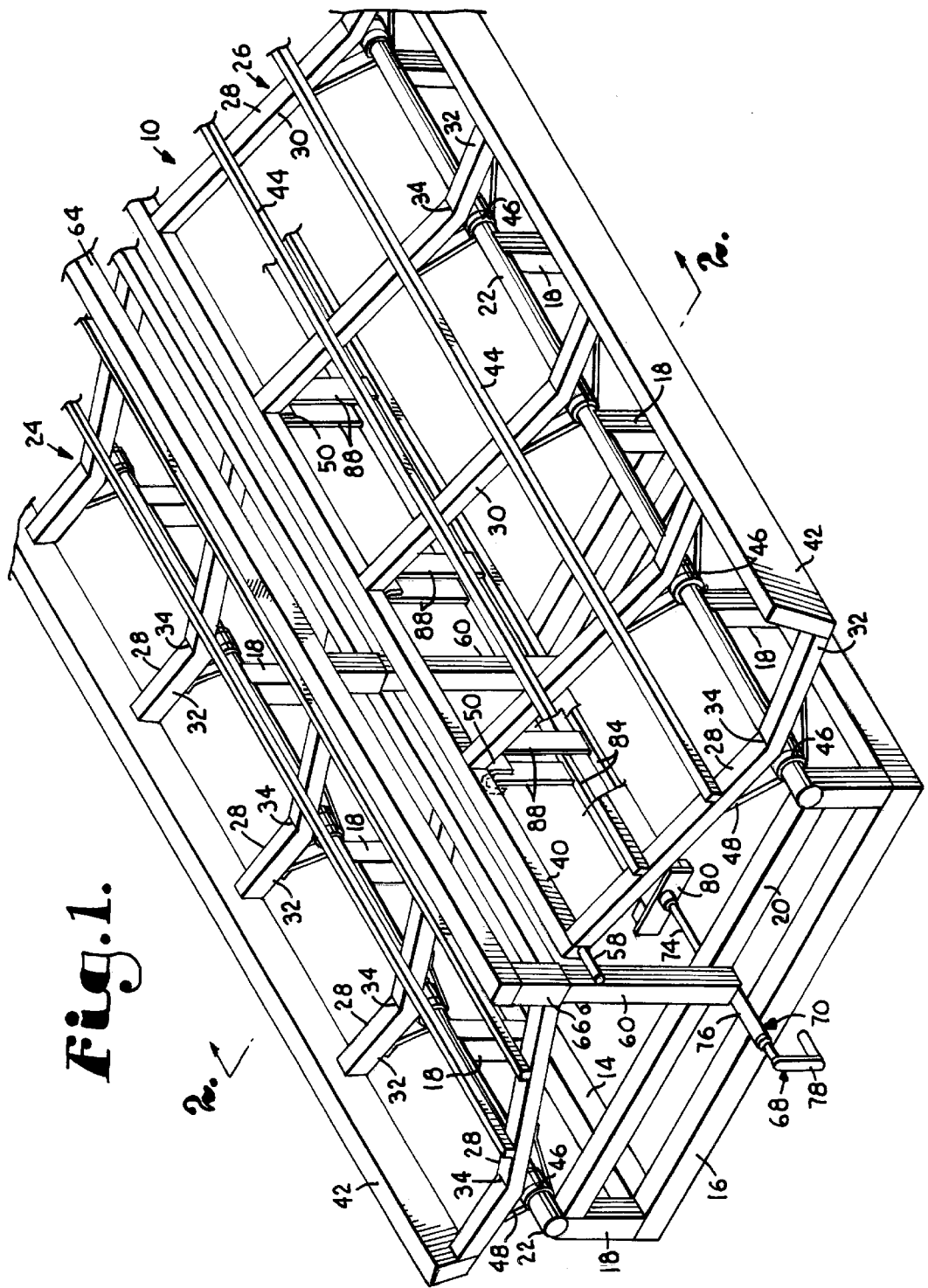

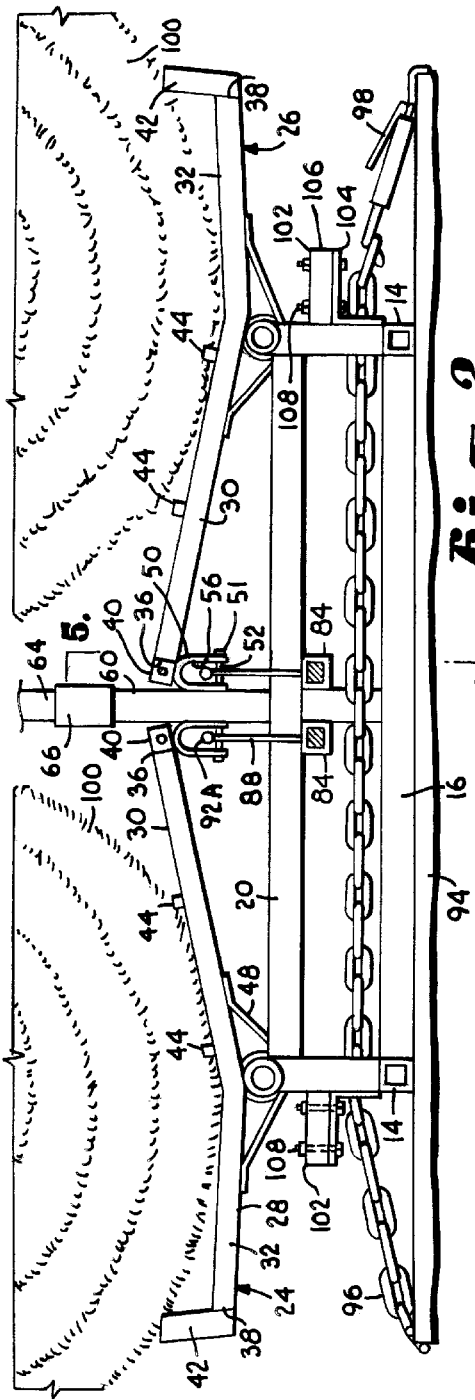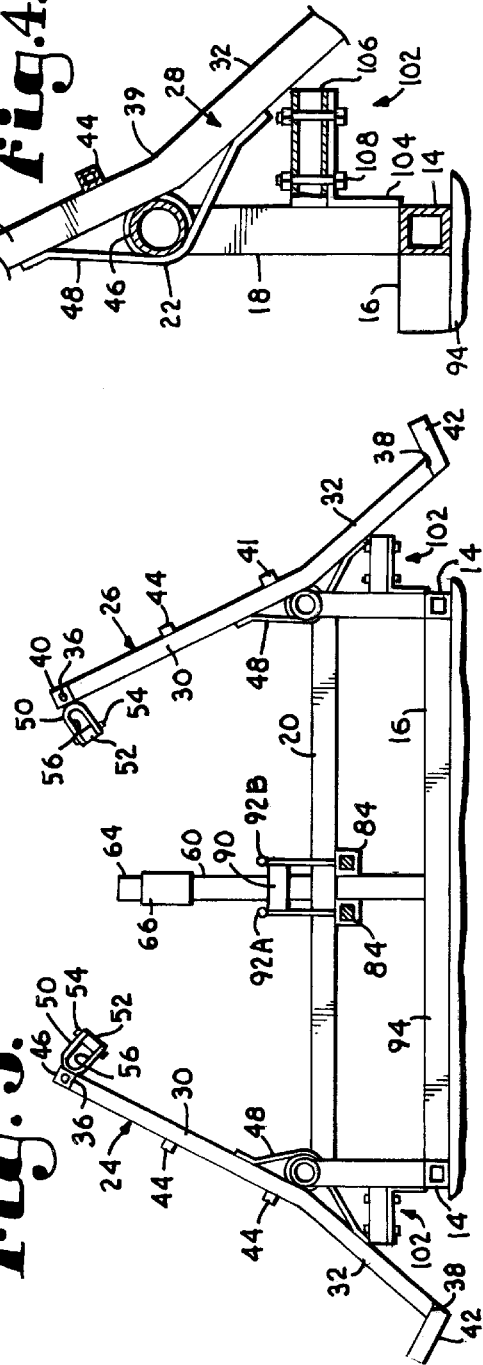

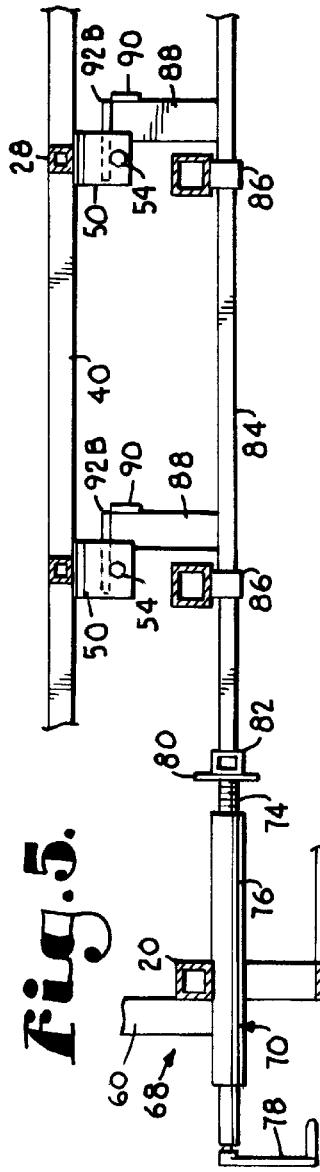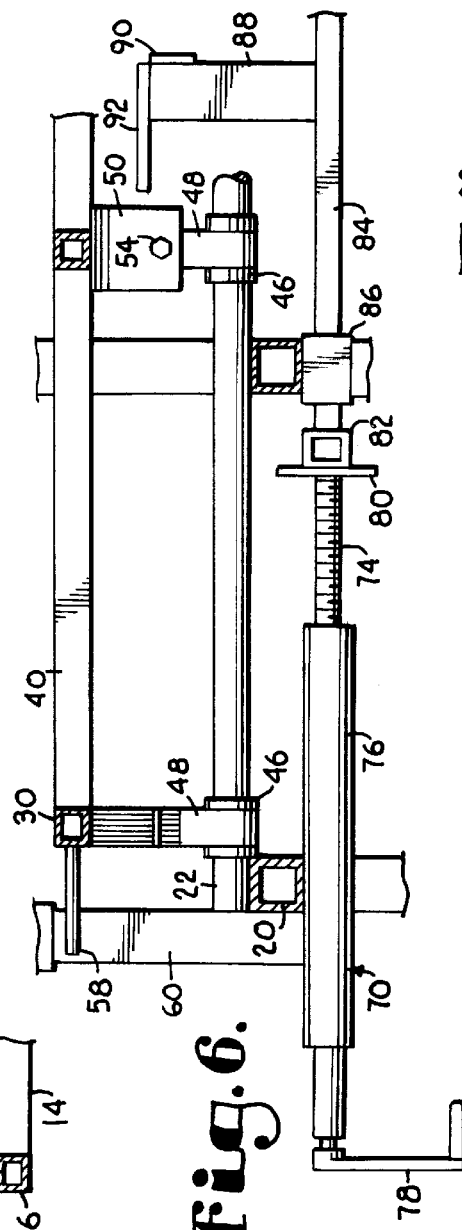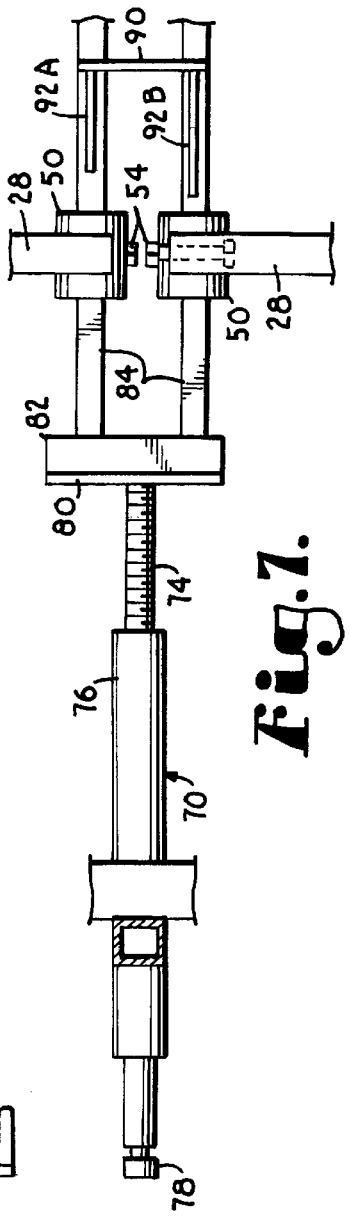

200
POSITIVE LOCKING MULTIPLE BALE TRANSPORTING DEVICE

CROSS-REFERENCE TO RELATED APPLICATION

This application claims the benefit of U.S. Provisional Application No. 60/033,228 filed Dec. 5, 1996.

STATEMENT REGARDING FEDERALLY SPONSORED RESEARCH OR DEVELOPMENT

Not applicable.

BACKGROUND OF THE INVENTION

This invention relates generally to a bale rack for supporting and transporting big round bales of hay and other crop material, and more particularly, to such a bale rack that is equipped with an improved bale cradle locking device.

Although hay was traditionally baled in small square bales that could be handled manually during hay making and livestock feeding activities, the use of large round bales has become increasingly popular as equipment has been developed to facilitate making and handling of the larger bales. For example, as balers for making large round bales have improved, many of the problems experienced with early attempts to use the bales have been overcome, such as providing a wrap for the bales to maintain their shape during transport, and providing protection of the bales from exposure to the elements.

In addition to improvements in the hay making equipment, handling equipment has also been developed to facilitate transporting the bales and making them available to livestock. For example, loader-mounted grab forks or tractor mounted spikes are commonly used for moving big round bales onto bale racks or into pick-up trucks so that the bales can be transported easily from the field to storage locations or to livestock enclosures. Recently, bale racks have been developed that are capable of transporting as many as twelve or more big round bales at a time, further facilitating the use of the big round bales by ranchers and farmers.

Typically, big round bales are transported in two side-by-side rows on a trailer, with the central axes of the big round bales oriented parallel with the direction of travel of the vehicle. A third row of bales is sometimes placed on top of, and between, the two lower rows of bales, forming a triangular shape. In one prior art bale rack the bales are stored in one of two pivoting bale supports. The bale supports pivot between a loaded position, in which the bales are maintained on the rack, and an unloaded position, in which the bales are unloaded from the rack. The bale supports are maintained in the loaded position with a latching mechanism that is operable from each side of the vehicle. While the overall design of the prior art structure is relatively simple to manufacture and use, the latching mechanism is cumbersome and must be operated from a position near the side of the vehicle.

Therefore, a bale rack for use in supporting and transporting multiple bales is needed which overcomes the drawbacks and deficiencies of the existing bale racks and vehicles discussed above.

BRIEF SUMMARY OF THE INVENTION

Accordingly, it is an object of the present invention to provide a bale rack which can be economically manufactured and which has an improved locking mechanism which selectively maintains the bales in a loaded position and which can be used to selectively unload the bales from each side of the device.

A further object of the invention is to provide a bale rack in which the bale cradles are positively locked in a loaded position and which can be unloaded safely from the front or rear of the transporting vehicle out of the way of the emptying bales.

According to the present invention, the foregoing and other objects are attained by a bale rack which has a base and first and second spaced bale cradles supported on the base for pivotal movement about longitudinally extending parallel axes. Each bale cradle includes at least one depending lock catch which presents an engagement surface extending in a direction transverse to the axes. The bale rack also includes a locking assembly for locking the bale cradles against pivotal movement. The locking assembly includes an elongated shaft extending in a direction parallel to the axes and a plurality of locking pins which are secured to the shaft and which extend in a direction parallel to the axes. The locking assembly further includes a linear actuator for translating the shaft axially to move the locking pins between a locked position and an unlocked position. In the locked position the locking pins extend over the engagement surfaces of the lock catches to lock the cradles against pivotal movement. In the unlocked position, the locking pins are withdrawn from over the engagement surfaces of the lock catches to unlock the bale cradles to allow pivotal movement.

Additional objects, advantages, and novel features of the invention will be set forth in part in the description which follows, and in part will become apparent to those skilled in the art upon examination of the following, or may be learned from practice of the invention.

BRIEF DESCRIPTION OF THE SEVERAL VIEWS OF THE DRAWING

In the accompanying drawing which forms a part of this specification and is to be read in conjunction therewith and in which like reference numerals are used to indicate like parts in the various views:

FIG. 1 is a partial perspective view of a bale rack according to the preferred embodiment of the invention, with the bale cradles shown in a closed and locked position;

FIG. 2 is a cross-sectional view of the bale rack, taken along line 2—2 of FIG. 1;

FIG. 3 is a view similar to FIG. 2, illustrating the bale cradles in an open and unloaded position;

FIG. 4 is an enlarged, fragmentary view of the bale rack, showing the bale cradle in an open and unloaded position;

FIG. 5 is a fragmentary side sectional view taken along line 5—5 of FIG. 2, showing a locking assembly forming a part of the bale rack in a locked position;

FIG. 6 is a fragmentary side sectional view of the invention locking assembly in an unlocked position; and FIG. 7 is a fragmentary top plan view of the locking assembly in an unlocked position.

DETAILED DESCRIPTION OF THE INVENTION

A bale rack embodying the principals of this invention is broadly designated in the drawing by the reference numeral 10. With initial reference to FIG. 1, bale rack 10 includes a generally rectangular carrier base 12 that has a pair of longitudinal legs 14 extending the length of carrier base 12. Welded between legs 14 are a plurality of spaced, parallel horizontal cross-braces 16. Extending from the top surface of longitudinal legs 14, and welded thereto, are a plurality of spaced vertical supports 18. Welded in spaced relation from cross-braces 16 between vertical supports 18 are a plurality of cross-supports 20, as is further described below. Together, legs 14, braces 16, vertical supports 18 and cross-supports 20 make up carrier base 12. Preferably, legs 14, cross-braces 16 and vertical supports 18 are all square-steel tubing and are welded together to ensure carrier base 12 is a rigid support structure.

Welded to the tops of the vertical supports 18 is an elongated, cylindrical pivot bar 22. As best seen in FIG. 2, the top surface of each vertical support 18 is shaped to mate with pivot bar 22. Preferably, pivot bar 22 is made of tubular, steel stock. Pivotally coupled to one pivot bar 22 is a first bale cradle 24. A second bale cradle 26 is pivotally coupled to the opposite pivot bar 22. First cradle 24 and second cradle 26 are similarly constructed and are mirror images of each other. Cradles 24 and 26 are used to support a pair of big round bales, as best seen in FIG. 2.

As best seen in FIG. 1, cradles 24 and 26 have a plurality of spaced, parallel support rails 28. Support rails 28 are preferably made from square-steel tubing., and are bent to present a long section 30 and a short section 32. Long section 30 transitions to short section 32 at a bend 34 which is generally proximate pivot bar 22. As best seen in FIGS. 2 and 3, long section 30 terminates at an inward end 36, and short section 32 terminates at an outward end 38. Welded to inward end 36 is an inward counter-balance 40, which extends along the length of cradles 24 and 26. Welded to outward end 38 of each support rail 28 is an outward counter-balance 42. As best seen in FIG. 2, outward counter-balance 42 protrudes upwardly from short section 32 to further facilitate containment of the bale within the cradle. Counter-balance 42 cooperates with the bale to bias cradles 24 and 26 to an unloaded position as is more fully described below. Inward counter-balance 40 and outward counter-balance 42 are welded to support rails 28 and maintain the support rails in spaced relation. Further, inward counter-balance 40 cooperates with outward counter-balance 42 to place the center of gravity of cradles 24 and 26 over their respective pivot bar 22. This enables the user to easily return the cradles to a lowered position after the bales have been unloaded from bale rack 10.

Welded to the tops of the long sections 30 and running the entire length of cradles 24 and 26 are a plurality of longitudinal rails 44. Rails 44 are preferably parallel and spaced so as to add structural support to cradles 24 and 26, as well as to provide support for the bales. Preferably, rails 44 are made from square steel stock. Additional rails 44 could be secured to support rails 28 for additional support of the bales.

As best seen in FIG. 4, secured to the bottom of each support rail 28 generally proximate bend 34 is a cylindrical bearing 46. Preferably, bearing 46 is welded to support rail 28. Pivot bar 22 extends through bearing 46 so that first cradle 24 and second cradle 26 are pivotally coupled to carrier base 12, and will rotate about pivot bar 22. Each support rail 28 is equipped with a support strap 48, which is preferably welded to bearing 46. Further, one end of strap 48 is welded to long section 30 of support rail 28, and the other end of strap 48 is welded to short section 32. Support straps 48 are preferably made of steel and add structural support to rails 28.

As best seen in FIG. 3, a U-shaped lock catch 50 is welded to the bottom of inward counter-balance 40. Lock catch 50 has a sleeve 52 disposed between its extending legs, and a bolt and nut assembly 54 extends through sleeve 52 to hold the sleeve in place. Sleeve 52, bolt 54 and lock catch 50 define an opening 56 which is used to secure cradles 24 and 26 in a closed position, as is more fully described below. At least one U-shaped lock catch 50 is provided on cradle 24 and cradle 26. Preferably though, a series of lock catches 50 are provided on each cradle in spaced relation.

As best seen in FIG. 1, extending outwardly from inward counter balance 40 is a cylindrical stop 58. Stop 58 is welded to inward counter balance 40 and operates to assist in preventing cradles 24 and 26 from pivoting inwardly beyond a desired location.

As best seen in FIG. 1, a plurality of spaced center supports 60 are welded to horizontal cross braces 16 and cross-supports 20 of carrier base 12. Preferably center supports 60 are made of square-steel tubing. The rearward-most support 60 terminates at cross-support 20 and is welded thereto. The remaining center supports 60 terminate at cross braces 16. Each of these center supports is co-planar with a corresponding cross-support 20. Cross-supports 20, other than the rearward-most cross-support, extend between a longitudinal leg 14 and a center support 60. Cross-supports 20 therefore are in two sections, with each section being welded at its inner end to a center support 60 and at its outer end to longitudinal leg 14.

Each of the center supports 60 has coupled thereto an upper support member 64. Support member 64 is preferably made of square-steel tubing and runs the entire length of bale rack 10. Support member 64 provides support on the occasion when a third bale is placed on top of, and between the bales resting on cradles 24 and 26. Welded to the bottom of support member 64 are a plurality of spaced, hollow, square caps 66. Caps 66 are used to removably mount upper support member 64 to center supports 60 by placing caps 66 over each center support. Generally, when shipping multiple bale racks 10 to a distributor or other seller, it is easiest to transport the racks 10 with support member 64 disengaged from center supports 60. With support member 64 removed, several bale racks 10 may be transported in a nesting relationship. Once at the establishment, support member 64 may be installed by placing caps 66 over center supports 60.

With reference to FIGS. 5 through 7, bale rack 10 is provided with a locking device 68. Locking device 68 includes a hand-jack 70 which is preferably welded to the rearward-most cross-support 20 and the rearward-most center support 60. Hand-jack 70 has a threaded rod 74 which is threadedly received in a housing 76. Rod 74 will extend from housing 76 upon a clockwise rotation of a handle 78. Conversely, rod 74 will retract into housing 76 upon a counter-clockwise rotation of handle 78. Secured to the free end of threaded rod 74 is a rectangular panel 80. As best seen in FIGS. 1 and 5, rod 74 is prefereably secured to the center of panel 80.

As best seen in FIGS. 6 and 7, panel 80 is welded to a cross-brace 82 on the side opposite threaded rod 74. Cross-brace 82 is preferably made of square steel tubing and operates to reinforce panel 80. Welded to, and extending from, cross-brace 82 are a pair of spaced, parallel rectangular locking shafts 84. Shafts 84 are slidingly received within a plurality of spaced guide bearings 86, as best seen in FIGS. 5 and 6. Bearings 86 are welded to center supports 60 and cross-supports 20 at the intersection thereof. Extending upwardly from each shaft 84 in spaced relation are a plurality of vertical arms 88. A pair of arms 88 are welded to shafts 84 at spaced locations. Arms 88 are supported in a vertical orientation by a support rib 90, which is welded between each pair of vertical arms.

Welded to the top of each vertical arm 88 is a rearwardly extending locking pin 92, which extends toward hand-jack 70. As best seen in FIG. 7, locking pins 92A associated with one shaft 84 are longer than the locking pins 92B associated with the opposite shaft 84. Preferably, the difference in length of locking pins 92A and 92B is about two inches. This difference in length allows bale cradle 24 to be unloaded while bale cradle 26 is maintained in a loaded position, as is more fully described below.

Locking pins 92 are thus coupled to bale rack 10 such that they are moveable relative to cradles 24 and 26. By rotation of handle 78 on hand jack 70, pins 92 can be moved longitudinally. Arms 88 are welded to shafts 84 at a location such that locking pins 92 may be moved, by operation of hand-jack 70, within openings 56 of lock catch 50 when cradles 24 and 26 are in a closed position. Cradles 24 and 26 will be positively maintained in this closed position until the user operates hand-jack 70 to release pins 92 from openings 56.

As best seen in FIG. 2, bale rack 10 may be secured to a trailer or truck bed 94 utilizing one or more chains 96 and clamps 98. Alternatively, bale rack 10 may be manufactured so as to be integral with a stand-alone trailer. The trailer would be equipped with wheels, axles and a frame, as well as a hitching mechanism, as is well known in the art. Further, bale rack 10 may be made in varying lengths to accommodate varying numbers of bales, as is desired by the user. For example, bale rack 10 could vary in capability from between 6 and 12 bales with varying lengths of between 16 and 32 feet.

In use, the empty bale rack would be oriented as shown in FIGS. 1 and 5. In this orientation, cradles 24 and 26 are oriented so that inward counter balance 40 and cylindrical stops 58 rest against center supports 60. The user would then rotate handle 78 of jack 70 to engage locking pins 92 within openings 56 defined by lock catch 50, sleeve 52 and bolt 54. In this position, cradles 24 and 26 would not be free to pivot about pivot bar 22. It is in this orientation that bales 100 could be loaded upon bale rack 10, as best seen in FIG. 2.

Bale rack 10 is constructed such that the center of gravity of big round bales 100 is located outwardly of pivot bar 22 so that cradles 24 and 26 will pivot about pivot bar 22 upon release of locking pins 92 from openings 56. After bales 100 are transported to a desired location, the user will rotate handle 78 on jack 70 to move locking pins 92 away from openings 56. Because locking pins 92A are shorter that locking pins 92B, pins 92A will be released from openings 56 prior to pins 92B. Because locking pins 92A are associated with first cradle 24, it will be unloaded before second cradle 26 is unloaded. Therefore, when locking pins 92A are completely free of openings 56, first cradle 24 will pivot about pivot bar 22 to an open position due to the weight of bales 100 and counter balance 42. Second cradle 26 is held in a closed position until handle 78 is further rotated.

If it is desired to unload bales 100 in only one direction, first cradle 24 may be unloaded as described above. The vehicle carrying bale rack 10 may then be turned around and handle 78 may be further rotated to disengage locking pins 92B associated with second cradle 26. Once locking pins 92B are completely free of openings 56, second cradle 26 will pivot to an unloaded position due to the weight of bale 100 and its center of gravity being located outwardly of pivot bar 22.

The fully unloaded position is best seen in FIG. 3. Cradles 24 and 26 are prevented from further rotation by positive stops 102. As best seen in FIG. 4, stops 102 include angled supports 104 which are welded to vertical support 18. Each angled support 104 has secured thereto a rectangular bracket 106. Bracket 106 is held to angled support 104 by bolts 108. Positive stops 102 are positioned so that cradles 24 and 26 can pivot to a position so that bales 100 will unload from bale rack 10, but that allows cradles 24 and 26 to be easily returned to a lowered position. Counter balances 40 and 42 operate to position the center of gravity of cradles 24 and 26 over pivot bar 22. Therefore, after each cradle has been unloaded, it can be easily returned to a lowered position by the user, due to the weight of counter balance 40. Cradles 24 and 26 will not be ready to load, however, until jack 70 is operated to place locking pins 92 within openings 56.

The user of bale rack 10 can operate the apparatus in a position at the rear end of the carrying vehicle, away from the unloading bales. Further, the user can unload first cradle 24 while maintaining second cradle 26 in a loaded position. The user can perform this unloading with the simple and reliable operation of hand-jack 70. Still further, once bales 100 have been unloaded, the user can secure cradles 24 and 26 in a closed position by rotating handle 78 of hand-jack 70. This rotation positively secures cradles 24 and 26 in a closed position. In this orientation, bale rack 10 is ready to be loaded with bales 100.

From the foregoing, it will be seen that this invention is one well adapted to attain all of the ends and objects hereinabove set forth, together with other advantages which are obvious and which are inherent to the structure. It will be understood that certain features and sub-combinations are of utility and may be employed without reference to other features and sub-combinations.

Since many possible embodiments may be made of the invention without departing from the scope thereof, it is to be understood that all matters herein set forth or shown in the accompanying drawings is to be interpreted as illustrative and not in a limiting sense.

Having thus described the invention, I claim:

1. A bale rack comprising:

a base;

first and second laterally spaced bale cradles supported on the base for pivotal movement about longitudinally extending parallel axes, each bale cradle including at least one depending lock catch presenting an engagement surface extending in a direction transverse to the axes; and a locking assembly for locking the bale cradles against pivotal movement, the locking assembly including an elongated shaft extending in a direction parallel to the axes, a plurality of locking pins secured to the shaft and extending in a direction parallel to the axes, and a linear actuator for translating the shaft axially to move the locking pins between a locked position in which the pins extend over the engagement surfaces of the lock catches to lock the bale cradles against pivotal movement and an unlocked position in which the locking pins are withdrawn from over the engagement surfaces of the lock catches to unlock the bale cradles for pivotal movement.

2. The bale rack of claim 1, wherein said locking pins are oriented in pairs, with a first locking pin of each said pair being associated with said first bale cradle and a second locking pin of each said pair being associated with said second bale cradle and wherein said first locking pin is shorter in length than said second locking pin, so that said first locking pin is withdrawn from over the engagement surfaces of the lock catches prior to said second locking pin.

3. The bale rack of claim 2, wherein said first and second bale cradles each have an inward counter-balance secured thereto proximate said lock catches, said inward counter-balance acting to facilitate movement of said first and second cradles to a lowered position wherein said locking pins may be moved into said locked position to lock the bale cradles against pivotal movement.

4. The bale rack of claim 3, wherein said base has a front and a rear end and wherein said locking device is located at the center of said base at the rear end.

5. The bale rack of claim 4, further comprising a center support member removably coupled to said base proximate said center and extending between said first and said second cradle.

6. A bale rack comprising:
 a base having a first side, a center and a second side spaced from said first side;
 a first bale cradle pivotally coupled to said base proximate said first side, said first cradle pivoting about an axis that is parallel to said first side, and a second bale cradle pivotally coupled to said base proximate said second side, said second cradle pivoting about an axis that is parallel to said second side, said first and second cradles having an inward end directed towards the center of said base and an outward end directed opposite said inward end;
 at least one lock catch coupled to said inward end of said first bale cradle;
 at least one lock catch coupled to said inward end of said second bale cradle;
 a locking device coupled to said base, said locking device having at least one locking pin coupled thereto for each said lock catch, said locking device being moveable relative to said base between a closed position wherein said locking pins are disposed within said lock catches to secure said cradles from pivotal movement and an open position wherein said locking pins are free from said lock catches to allow pivotal movement of said cradles, wherein said locking pins are oriented in pairs, with a first locking pin of each said pair being associated with said first bale cradle and a second locking pin of each said pair being associated with said second bale cradle and wherein said first locking pin is shorter in length than said second locking pin; and
 a means for moving said locking device between said closed and said open position.

7. The bale rack of claim 6, wherein said moving means comprises a screw mechanism, said screw mechanism having a handle coupled to a threaded rod which is coupled to said locking pins, so that rotation of said handle moves said locking pins between said closed position and said open position.

8. The bale rack of claim 7, wherein said first and second bale cradles each have an inward counter-balance secured to their inward ends, said inward counter-balance acting to facilitate movement of said first and second cradles to a lowered position wherein said locking pins may be moved within said lock catches to prevent said first and second cradles from pivotal movement.

9. The bale rack of claim 8, wherein a plurality of bales may be placed on said first and second cradles and wherein said axis of said first cradle is located inwardly of the center of gravity of the bales placed on said first cradle and wherein said axis of said second cradle is located inwardly of the center of gravity of the bales placed on said second cradle so that said first and second cradles will pivot when said locking device is moved to said open position.

10. The bale rack of claim 9, wherein said base has a front and a rear end and wherein said locking device is located at the center of said base at the rear end.

11. The bale rack of claim 10, further comprising a center support member removably coupled to said base proximate said center and extending between said first and said second cradle.

12. The bale rack of claim 11, further comprising at least one first positive stop rigidly secured to said first side of said base and at least one second positive stop rigidly secured to said second side of said base, said first and second stops operating to prevent said first and second cradles from pivoting beyond said positive stops.

13. A bale rack comprising:
 a generally rectangular base presenting front and rear ends and a longitudinal axis extending between said ends;
 a first bale cradle and a second bale cradle pivotally coupled to said base, said first and second cradles each having an inward end directed towards the center of said base and an outward end directed outwardly away from said base;
 at least one lock catch coupled to said inward end of said first bale cradle and said second bale cradle;
 an elongated shaft coupled to said base with at least one locking pin coupled thereto for each said lock catch, said elongated shaft moveable between a closed position wherein said locking pins are disposed within said lock catches to secure said cradles from pivotal movement and an open position wherein said locking pins are free from said lock catches to allow pivotal movement of said cradles; and
 a screw mechanism coupled to said base and said elongated shaft, said screw mechanism having a handle operable to move said shaft longitudinally relative to said base so that said shaft is moveable between said closed and said open position.

14. The bale rack of claim 13, wherein said locking pins are oriented in pairs, with a first locking pin of each said pair being associated with said first bale cradle and a second locking pin of each said pair being associated with said second bale cradle and wherein said first locking pin is shorter in length than said second locking pin.

15. The bale rack of claim 14, wherein said first and second bale cradles each have an inward counter-balance secured to their inward ends, said inward counter-balance acting to bias said first and second cradles to a lowered position wherein said locking pins may be moved within said lock catches to prevent said first and second cradles from pivotal movement.

16. The bale rack of claim 15, wherein said first and said second cradles are made from a plurality of spaced support rails of square steel tubing bent proximate the pivot point of said first and second bale cradles.

* * * * *